Sept. 21, 1937.  J. SCHULMAN  2,093,740
CONVERTIBLE LUGGAGE CARRIER AND BUMPER
Filed March 9, 1936
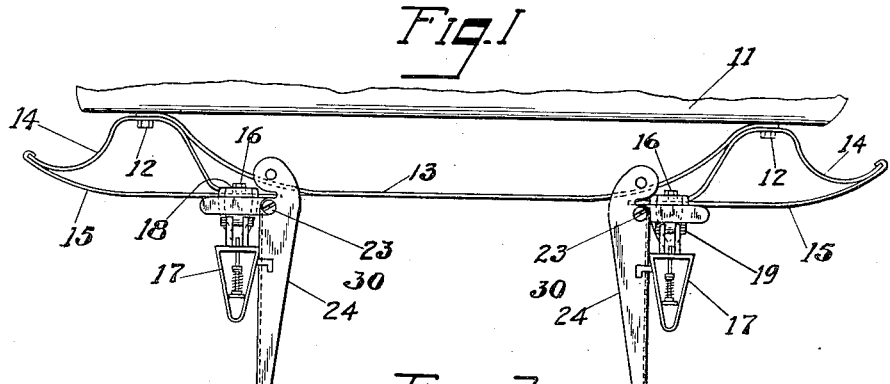
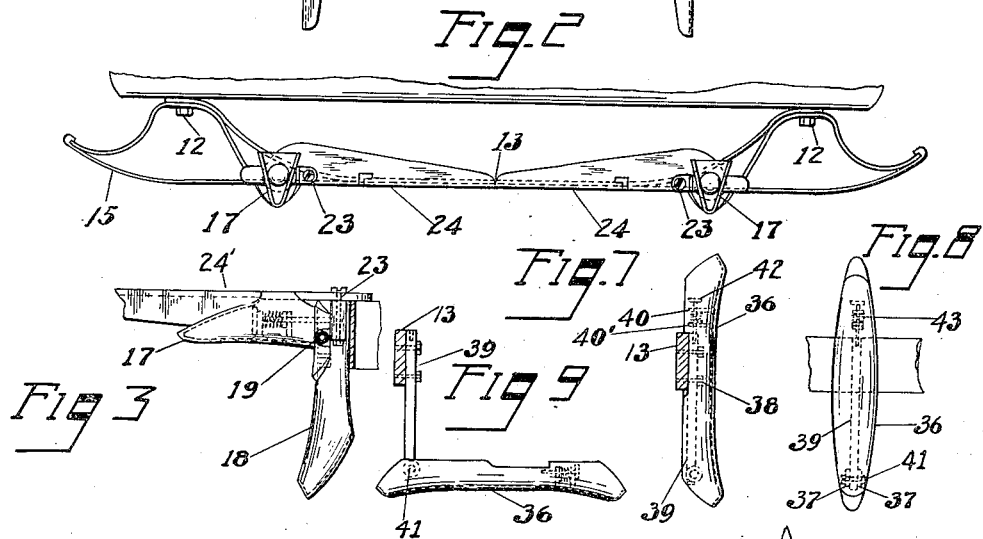
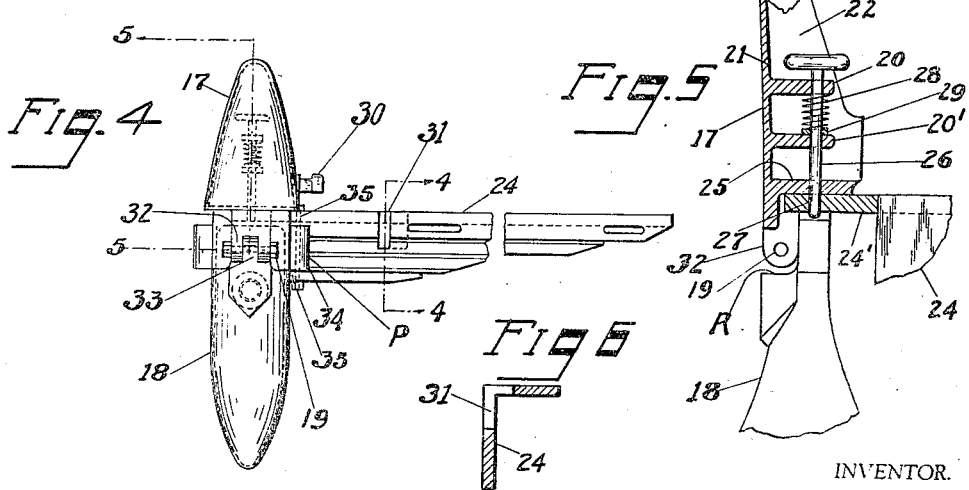
INVENTOR.
JOSEPH SCHULMAN
BY
ATTORNEY.

Patented Sept. 21, 1937

2,093,740

UNITED STATES PATENT OFFICE 2,093,740

CONVERTIBLE LUGGAGE CARRIER AND BUMPER

Joseph Schulman, New York, N. Y.

Application March 9, 1936, Serial No. 67,925

5 Claims. (Cl. 293—55)

This invention relates to bumper and bumper guards which may be converted into luggage carriers, for motor vehicles.

An object of this invention resides in the provision of motor vehicle accessories convertible into either a bumper or luggage carrier arms, as required.

Another object of this invention resides in the provision of motor vehicle accessories convertible into either bumper guards or luggage carrier arms or supports, as required.

A further object of the present invention resides in the provision of a motor vehicle bumper convertible into a luggage carrier and which when in position to perform the function of a bumper does not resemble nor outwardly manifest its use as a luggage carrier.

A still further object of this invention resides in the provision of motor vehicle bumper guards convertible into a luggage carrier.

A still further object of this invention resides in the provision of motor vehicle bumper and bumper guards, the bumper being convertible into a luggage carrier, and the guards being convertible into auxiliary luggage supports cooperable with the bumper to increase its luggage carrying capacity and to strengthen the said bumper when used as a luggage carrier.

A further object of this invention resides in the provision of a pair of spaced pivoted members which when in operative position constitute a luggage carrier and when in inoperative position constitute the elements of a bumper, for a motor vehicle.

A further object of this invention resides in the provision of a member for a motor vehicle and comprising a pair of pivoted parts constituting a bumper guard when arranged in one position with relation to each other and a luggage carrier when arranged in another position.

A further object of this invention resides in the provision of a pair of spaced members for a motor vehicle, each member comprising a pair of pivoted parts, the members constituting bumper guards when the parts of each member are arranged in one position with relation to each other and the members jointly constituting a luggage carrier when the parts of each member are arranged in another position.

A still further object of this invention resides in adapting the hereinbefore mentioned forms of this device for attachment and as an auxiliary to the existing motor vehicle bumper.

The disclosure made the basis of exemplifying the present inventive concept suggests practical embodiments thereof, but the invention is not to be restricted to the exact details of this disclosure, and the latter, therefore, is to be understood from an illustrative rather than a restrictive standpoint.

The above several advantageous objects are attained by the novel design, construction and arrangement of parts, as hereinafter described and illustrated in the accompanying drawing, constituting a feature of this disclosure, and in which:

Fig. 1 is a plan view of a combination embodying the invention and showing the parts in extended luggage-carrying position.

Fig. 2 is a plan view of such combination showing the said parts drawn back into bumper position.

Fig. 3 is a side elevational view of the pivoted parts of a bumper guard, one of the parts being swung at a right angle to a position ready to function as a luggage carrier.

Fig. 4 is a front elevational view of a bumper guard and bumper arm.

Fig. 5 is a section taken through line 5—5 of Fig. 4.

Fig. 6 is a section taken through line 4—4 of Fig. 4.

Fig. 7 is a side elevation of a bumper guard in a modified form.

Fig. 8 is a front view of the guard shown in Fig. 7.

Fig. 9 is a side elevational view of the guard shown in Fig. 7, the guard being pivotally swung to operating position as a luggage carrier.

Referring to the drawing, let the numeral 11 indicate a part of the motor vehicle. Secured to part 11 by means of bolts 12 is the substantially bow-shaped spring member 13 which constitutes a spring stop for the arms 24, later described, when the latter function as a bumper. Secured to the same bolts 12 are the bent spring end elements 14 each of which carries an end bumper bar section 15 which substantially form continuations of or end extensions for the said arms 24 when in bumper acting position (see Fig. 2). Secured to bumper bar sections 15 and or elements 14, by any suitable means, as by bolts 16, are a pair of spaced bumper guards, each guard comprising two preferably hollow or recessed parts 17, 18. Part 17 is pivotally connected to part 18 at 19 to swing in a vertical plane to a horizontal position, by any suitable means, such as for example, the depending spaced ears 32, of part 17 and lug 33 of part 18 interposed between the ears, the ears and lug having alined holes to receive the pivot shaft or pin 19, the part 18 being recessed at either side of lug 33 indicated at R to receive the pivoting ears 32.

Guard part 17 is provided with lugs 20, 20' projecting from a side wall 21 to within recess or hollow 22. Pivoted to each bumper guard part 18 at 23 to swing in a horizontal plane is a bumper arm 24, having an extension 24', the pivots being so arranged that the said arms are opposite each other and on the inside of the bumper guards, being adapted to be swung towards each other into alinement to constitute a bumper as shown in Fig. 2 and from each other to substantial parallel position to constitute luggage carrying arms as shown in Fig. 1. For this purpose a lug 34 laterally extends from the upper end of guard part 18, the said lug being provided with a vertical hole in alinement with the holes in spaced ears 35, between which ears 35 lug 34 is disposed, a pivot pin or shaft P being received in said alined holes.

As shown in Fig. 6, which is a cross-sectional view, bumper arms 24 are angularly shaped so as to permit them to overlap and conceal bar 13 when in closed position. Lugs 20, 20', lower end 25 of guard part 17, and extension 24' of arm 24 are provided with alined holes through which projects plunger 26 into recess 27 formed in the upper part of guard part 18 to maintain guard part 17 in vertical position and arm 24 in closed position against bar 13. Plunger 26 is held under tension by helical spring 28, the latter at one end abutting against the under side of lug 20 and exerting a pressure at its other end against collar 29 on plunger 26. This pressure keeps plunger 26 down in locking position to prevent any outward movement of arm 24.

By lifting plunger 26, guard part 17 and bumper arm 24 are released permitting said arm to be swung horizontally on pivot 23 to luggage-carrying operating position and said guard part to be swung vertically into a horizontal position. Each bumper guard part 17 has a boss or raised portion 30 so that when part 17 is swung on pivot 19 into horizontal position, this portion or boss 30 will snugly fit into slot 31 of arm 24 to lockingly maintain arm 24 in outwardly swung position. The guard part 17 in this position functions as an auxiliary luggage-carrying arm.

Figs. 7-9 show a bumper guard in modified form indicated by the numeral 36. This bumper guard may be U-shaped in cross section to provide a recess within which extend lugs 40, 40'. For attachment to bar 13 as by means of bolt 38 is a vertical arm 39 having a hole at or near its lower end.

Bumper guard 36 is pivoted at one end to arm 39, for which purpose guard 36 may be provided with a pair of spaced ears 37 between which is disposed the end of arm 39, the ears having holes in alinement with the hole of the arm within which holes is received a pivot pin or shaft 41. Lugs 40, 40' of guard 36 are provided with holes and arm 39 with a recess, the holes and recess being in vertical alinement to receive a plunger 42. A spring 43 operable as spring 28 urges the plunger in engagement with arm 39, lockingly maintaining bumper guard 36 in vertical position. By retracting plunger 42 against the action of spring 43, guard 36 is released and may be swung to horizontal position as shown in Fig. 9 to serve as a luggage carrying arm.

It will be noted (see Fig. 9) that when bumper guard 36 is in luggage-carrying position it is in a plane below that of the bumper. The bumper guard part 17 is shown in Figs. 1-5, as being substantially on the same plane as the bumper, when said part is in luggage carrying position, in which event the luggage to be supported by the bumper arms and bumper guards may extend back thereof.

I desire it understood that the invention is not to be confined to the particular forms shown and described, the same being merely illustrative, and that the invention can be carried out in other ways without departing from the spirit of my invention, and therefore, I claim broadly the right to employ all equivalent instrumentalities coming within the scope of the appended claims, and by means of which objects of my invention are attained and new results accomplished, as it is obvious that the particular embodiments herein shown and described are only some of many that can be employed to attain these objects and accomplish these results.

Having described my invention what I claim as new and desire to secure by Letters Patent, is:—

1. A device for attachment to a motor vehicle having a member, a part stationarily attached to said member, a second part pivoted to said first part adapted to swing in a vertical plane, means to keep said second part in vertical alinement with said first part, an arm pivoted to said first part and adapted to swing in a horizontal plane, cooperating means on said second part and said arm to keep said arm in an outward position relative to said member to constitute a luggage-carrying element, and means to keep said arm in another position to constitute a bumper.

2. A device for attachment to a motor vehicle having a member, a part stationarily attached to said member, a second part pivoted to said first part adapted to swing in a vertical plane, an arm pivoted to said first part and adapted to swing in a horizontal plane, and cooperating means on said second part and said arm to keep said arm in an outward position relative to said member to constitute a luggage-carrier element, said arm constituting a bumper when positioned adjacent said member.

3. A device for attachment to a motor vehicle having a member, a part stationarily attached to said member, a second part pivoted to said first part adapted to swing in a vertical plane, an arm pivoted to said first part and adapted to swing in a horizontal plane.

4. A device for attachment to a resilient member of a motor vehicle and comprising a part to be stationarily carried by said member and another part swingable in a vertical plane to assume different angular positions relative to said first part to constitute either a luggage-carrier element or a bumper, said fixed part including an end bumper section.

5. A device for attachment to a resilient member of a motor vehicle and comprising a part to be stationarily attached to said member and another part swingable in a vertical plane relative to said first part to constitute either a luggage-carrier element or a bumper guard, and means to retain said swingable part in vertical alinement with said first part, said stationary part including an end bumper section.

JOSEPH SCHULMAN.